US012466799B2

(12) United States Patent
Graf et al.

(10) Patent No.: US 12,466,799 B2
(45) Date of Patent: Nov. 11, 2025

(54) METHOD FOR PRODUCING N,N-DISUBSTITUTED BENZTHIAZOLYL-SULFENAMIDES

(71) Applicant: LANXESS Deutschland GmbH, Cologne (DE)

(72) Inventors: Holger Graf, Haan (DE); Melanie Wiedemeier-Jarad, Dormagen (DE); Jörg Hagemann, Cologne (DE); Nele De Smet, Nieuwerkerken (BE)

(73) Assignee: LANXESS Deutschland GmbH, Cologne (DE)

( * ) Notice: Subject to any disclaimer, the term of this patent is extended or adjusted under 35 U.S.C. 154(b) by 897 days.

(21) Appl. No.: 17/605,301

(22) PCT Filed: Apr. 22, 2020

(86) PCT No.: PCT/EP2020/061175
§ 371 (c)(1),
(2) Date: Oct. 21, 2021

(87) PCT Pub. No.: WO2020/216780
PCT Pub. Date: Oct. 29, 2020

(65) Prior Publication Data
US 2022/0213045 A1 Jul. 7, 2022

(30) Foreign Application Priority Data
Apr. 25, 2019 (EP) .................................... 19171088

(51) Int. Cl.
*C07D 277/80* (2006.01)

(52) U.S. Cl.
CPC .................................. *C07D 277/80* (2013.01)

(58) Field of Classification Search
CPC ........................................................ C07D 277/80
USPC .......................................................... 548/168
See application file for complete search history.

(56) References Cited

U.S. PATENT DOCUMENTS

| 2,419,283 A | 4/1947 | Paul et al. |
| 3,549,650 A | 12/1970 | D Amico |
| 4,719,305 A | 1/1988 | Rollick |
| 6,107,378 A | 8/2000 | Imashiro et al. |
| 7,361,701 B2 | 4/2008 | Takahashi et al. |

FOREIGN PATENT DOCUMENTS

| CN | 102838564 A | * | 12/2012 |
| EP | 0195738 | * | 9/1986 |
| EP | 0314663 A1 | | 5/1989 |
| EP | 0 721 946 A | | 7/1996 |
| JP | 2010275230 A | | 12/2010 |

OTHER PUBLICATIONS

European Search Report from corresponding European Application No. 19171088, dated Sep. 24, 2019, two pages.
Carr, et al., XP000566968, "Thiazolylsulfenamides", Journal of Organic Chemistry, Bd. 14, Nr. 6, 1948, pp. 921-934.

* cited by examiner

*Primary Examiner* — Taylor V Oh
(74) *Attorney, Agent, or Firm* — Nicanor A. Kohncke; Christopher L. McDavid; Ewa M. Wozniak

(57) ABSTRACT

The invention relates to a method for preparing N, N-disubstituted benzthiazolylsulfenamides.

12 Claims, No Drawings

METHOD FOR PRODUCING N,N-DISUBSTITUTED BENZTHIAZOLYL-SULFENAMIDES

The invention relates to a method for preparing N, N-disubstituted benzthiazolylsulfenamides.

N, N-disubstituted benzothiazolylsulfenamides are used primarily as slow-acting vulcanization accelerators in the rubber industry, especially in adhesive mixtures in the tire industry.

Methods for preparing N, N-disubstituted benzothiazolylsulfenamides are known, for example, from EP-A-0 721 946. In a one-pot synthesis, dibenzothiazolyl disulfide, dibenzylamine and methanol are initially charged and heated to 60° C., before chlorine is introduced via a capillary tube. After the subsequent treatment with 25% aqueous sodium hydroxide solution, the product is filtered off and washed with methanol and water.

Chlorine/chlorine gas is known to be a very effective oxidizing agent. However, special safety measures must be observed when handling these highly toxic chemicals. All conceivable risks in production, transport and storage due to incidents and accidents must be taken into account. Leaks of chlorine and hydrogen chloride gas into the atmosphere must be prevented at all costs, so an alternative to the aforementioned manufacturing process was sought.

In addition, EP 0 195 738 discloses a method in which N, N-disubstituted benzothiazolylsulfenamides are reacted by reacting sodium salts of 2-mercaptobenzothiazole with diisopropylamine and sodium hypochlorite in acidic medium. However, this method has the disadvantage that the end product is only obtained in low yield and purity and with a high proportion of free amines.

The object of the present invention was now to provide an economical and more easily manageable method for preparing N, N-disubstituted benzothiazolesulfenamides, in particular N, N-dibenzylbenzothiazolylsulfenamide (DBBS) or N, N-diisopropylbenzothiazolylsulfenamide, starting from substituted 2-mercaptobenzothiazoles, taking into account safety-related aspects, preferably in a one-pot reaction. In particular, an oxidizing agent other than chlorine gas should be used in order to minimize the risks associated with handling this chemical.

Surprisingly, it has now been found that N, N-disubstituted benzothiazolesulfenamides can be prepared by reacting substituted 2-mercaptobenzothiazoles with amines in the presence of sodium hypochlorite as oxidizing agent.

The present invention relates to a method for preparing N, N-disubstituted benzothiazolylsulfenamides of the formula (I),

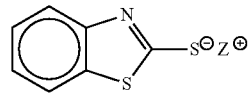

where $R^1$, $R^2$=each independently —CH($R^3$)($R^4$)
where $R^3$, $R^4$=each independently H, $C_1$-$C_3$-alkyl, preferably methyl, or

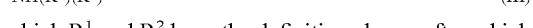

where $R^5$=$C_1$-$C_3$-alkyl,
y=0 to 6, preferably 0 to 2, particularly preferably 0 and
n=0 to 5, preferably 0, by reacting 2-mercaptobenzothiazole salts of the formula (II)

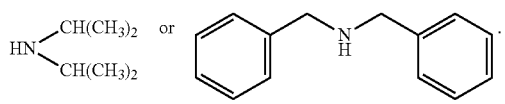

where Z=Na or K, preferably Na,
with amines of the formula (III)

$$NH(R^1)(R^2) \quad\quad (III)$$

in which $R^1$ and $R^2$ have the definition above, after which the reaction is carried out in the presence of sodium hypochlorite at a pH of 10 to 12.

The compound of the formula (I) is preferably N, N-dibenzylbenzothiazolylsulfenamide (DBBS) or N, N-diisopropylbenzothiazolylsulfenamide.

In a preferred embodiment of the method according to the invention, the radicals $R^1$, $R^2$ are the same within the molecule.

The sodium salt of 2-mercaptobenzothiazole (NaMBT) is preferred as compounds of the formula (II).

Compounds of the formula (III) are preferably

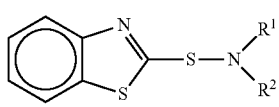

In a further preferred embodiment of the method according to the invention, the compound of the formula (II)

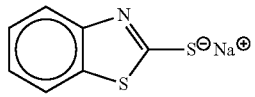

is used in combination with

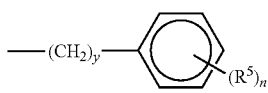

as compound of the formula (III).

The sodium hypochlorite used is preferably an at least 14% sodium hypochlorite solution. Particular preference is given to 14.1-18% sodium hypochlorite solutions.

In a preferred embodiment of the invention, the method is carried out at temperatures of 30 to 50° C., particularly preferably 40 to 50° C.

In a preferred embodiment of the invention, the method is carried out in the presence of $C_1$-$C_4$-alcohols and/or water.

In the context of the invention, preferred $C_1$-$C_4$-alcohols are methanol, ethanol, isopropanol, n-butanol, tert-butanol or mixtures of these alcohols. Particular preference is given to using isopropanol in the method according to the invention.

In the method according to the invention, the compound of the formula (III) is preferably initially charged optionally in water and/or alcohol and the compound of the formula (II) and sodium hypochlorite solution are metered in.

In a further preferred embodiment of the invention, the method is carried out at a pH of 10 to 12 (determined at 46° C.). Particular preference is given to a pH in the range of 10.3-11. To adjust the pH, an acid is preferably metered in, preferably during the addition of the compound (II) and sodium hypochlorite. Strong inorganic acids are preferred as acids, sulfuric acid being particularly preferred.

In a further preferred embodiment of the invention, the pH is adjusted with aqueous sodium hydroxide solution after addition of the compound of the formula (II).

If the method according to the invention is carried out in the presence of alcohol, preferably 300 to 1300 parts of alcohol (100%) are used per 50-1000 parts of amine of formula (II), particularly preferably N,N-diphenylamine. Particular preference is giving to additionally adding 50-1000 parts of water thereto.

In the method according to the invention, preferably the molar ratio of the compound of formula (II) to the compound of formula (III) used is from 1.4:1 to 0.8:1.

The method according to the invention is preferably carried out in batchwise mode, in what is known as a one-pot reaction.

For the method according to the invention, the reaction time is preferably in the range of 15 minutes to 5 hours, especially preferably 2-5 hours.

The sodium hypochlorite is usually added by introducing it via a metering pump and with stirring.

The compound of the formula (I) is preferably separated off by means of filtration, customary suction filters being suitable.

In a further embodiment of the invention, the product is washed, preferably using $C_1$-$C_4$-alcohol and/or water.

The method according to the invention is preferably carried out as follows:

The compound of the formula (III), preferably dibenzylamine, and an alcohol, preferably isopropanol, are initially charged in water. After stirring the reaction mixture, a mixture of the compound of the formula (II), preferably sodium mercaptobenzothiazole (NaMBT), and sodium hypochlorite is added, preferably at temperatures of 40 to 50° C. The pH during the metered addition is preferably in the range of 10.3 to 11, which is ideally adjusted using sulfuric acid.

A pH in the range of 11.3 to 12 is then set, preferably using aqueous sodium hydroxide solution, followed by stirring and preferably water is added. The product is preferably filtered off. The subsequent purification is preferably carried out by washing first with alcohol, preferably isopropanol at 35-45° C. and then preferably with water at 55-65° C.

The present invention is explained in more detail by the following experimental example, without the invention being restricted thereto.

WORKING EXAMPLES

Example 1

The apparatus used was a 2 l flat-flanged beaker, equipped with a Mig stirrer (3 blade); jacket heating/cooling; pH and redox measuring device; thermometer; metering pumps for sodium hypochlorite (NaOCl) and the aqueous solution of the sodium salt of 2-mercaptobenzothiazole (NaMBT) and a dropping funnel for pH-controlled metered addition of sulfuric acid or aqueous sodium hydroxide solution.

203.4 g of dibenzylamine (97%) and 531 g of isopropanol (water content <1%) were initially charged in this flat-flanged beaker with 195 g of water. The reaction mixture was then stirred and the following mixture was metered in at an internal temperature of 46° C. over the course of 3 hours:

446.1 g of 50.50% aqueous NaMBT solution (density: 1.245)=119 ml/h (358 ml)
834.2 g of 14.21% aqueous NaOCl (density: 1.22)=228 ml/h (683.8 ml)

Then, 5 g of NaOCl was added to the chemicals initially charged in the flat-flanged beaker over 1-5 minutes.

During the metered addition, a pH of 10.5 was maintained in the reaction mixture, which was effected by means of sulfuric acid.

The pH was then adjusted to 11.5 with 1.6 g of 48% aqueous sodium hydroxide solution, 245 ml of water were added and the mixture was stirred for 15 minutes. The suspension was filtered off under suction at 40° C. through a 18.5 cm diameter black-band filter.

The product was filtered off, washed with 625 g of aqueous isopropanol (35%) at 40° C. and then with 1165 g of water at 60° C.

The filter cake was dried to constant mass in a drying cabinet at ca. 50° C.

This gave 283.6 g of N, N-dibenzylbenzothiazolylsulfenamide (DBBS). According to HPLC analysis, the active ingredient content (titration) was over 98%; free amine was measured at <0.7%. Furthermore, the melting point was in a range of 90-100° C., preferably 92.5-93.2° C.

Comparative Examples 1a, 1b and 1c

The method was carried out analogously to Example 1 but at a pH of 8, 9 and 12 respectively.

The following results were obtained:

| Ex. no. | pH | Yield [%] | Purity [%] | Free amines [%] |
|---|---|---|---|---|
| 1 (inv.) | 10.5 | >92 | >97 | 0.20 |
| 1a (comp.) | 8 | 60 | 85 | 0.85 |
| 1b (comp.) | 9 | 80 | 90 | 0.58 |
| 1c (comp.) | 13 | No product | No product | |

It was found that the method according to the invention made it possible to prepare N, N-substituted benzothiazolylsulfenamides of the formula (I) without the need to use elemental chlorine and afforded significantly improved results compared to the method known in the prior art (EP 0 195 738) using sodium hypochlorite and at a pH of 8 to 9.

What is claimed is:

1. A method for preparing N, N-disubstituted benzothiazolylsulfenamides of the formula (I)

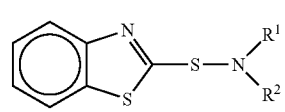

(I)

where $R^1$, $R^2$=each independently —$CH(R^3)(R^4)$
where $R^3$, $R^4$=each independently H, $C_3$-alkyl,

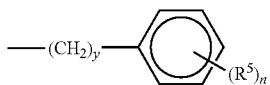

and R⁵=$C_1$-$C_3$-alkyl,
y=0 to 2, and
n=0 to 5,
by reacting 2-mercaptobenzothiazole salts of the formula (II)

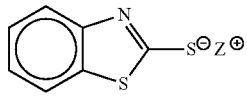

where Z=Na or K,
with amines of the formula (III)

NH(R¹)(R²)  (III)

in which R¹ and R² have the definition above,
wherein the reaction is carried out in the presence of sodium hypochlorite at a pH of 10 to 12.

2. The method as claimed in claim 1, wherein the N, N-substituted benzothiazolylsulfenamides of the formula (I) are N, N-dibenzylbenzothiazolylsulfenamide (DBBS).

3. The method as claimed in claim 1 wherein the compound of the formula (II) used is

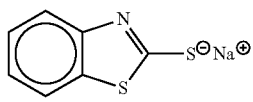

and
the compound of the formula (III) used is
or

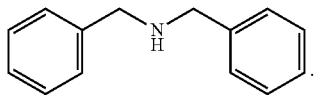

4. The method as claimed in claim 1 wherein the reaction is carried out at temperatures of 30 to 50° C.

5. The method as claimed in claim 1, wherein the reaction is carried out in the presence of at least one $C_1$-$C_4$-alcohol and/or water.

6. The method as claimed in claim 4, wherein the compound of the formula (III) is initially charged, optionally in the presence of water and/or alcohol, and the compound of the formula (II) and sodium hypochlorite are metered in, the pH being adjusted with sulfuric acid during the metered addition.

7. The method as claimed in claim 4 wherein the pH is adjusted with aqueous sodium hydroxide solution after addition of the compound of the formula (II) and the sodium hypochlorite.

8. The method as claimed in claim 1 wherein the molar ratio of the compound of the formula (II) to the compound of the formula (III) used is from 1.4:1 to 0.8:1.

9. The method as claimed in claim 1, wherein y=0.

10. The method as claimed in claim 1, wherein n=0.

11. The method as claimed in claim 2, wherein the compound of the formula (II) used is

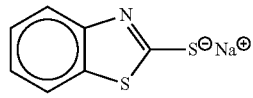

and
the compound of the formula (III) used is
or

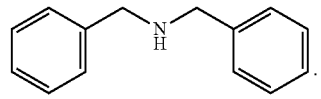 [SMILES: c1ccc(CNCc2ccccc2)cc1]

12. The method as claimed in claim 6, wherein the pH is adjusted with aqueous sodium hydroxide solution after addition of the compound of the formula (II) and the sodium hypochlorite.

\* \* \* \* \*